United States Patent
Lai

(10) Patent No.: US 10,067,769 B2
(45) Date of Patent: Sep. 4, 2018

(54) CHECKING METHOD FOR ELECTRONIC DEVICE AND COMPUTER PROGRAM PRODUCT THEREOF

(71) Applicant: Wistron Corporation, New Taipei (TW)

(72) Inventor: Cheng-Chia Lai, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 106 days.

(21) Appl. No.: 15/145,898

(22) Filed: May 4, 2016

(65) Prior Publication Data
US 2017/0242706 A1    Aug. 24, 2017

(30) Foreign Application Priority Data
Feb. 18, 2016  (TW) .............................. 105104828 A

(51) Int. Cl.
G06F 9/44     (2018.01)
H04W 4/00    (2018.01)
G06F 9/4401  (2018.01)
H04W 4/80    (2018.01)

(52) U.S. Cl.
CPC ............ *G06F 9/4401* (2013.01); *H04W 4/80* (2018.02); *G06F 9/442* (2013.01)

(58) Field of Classification Search
CPC ....... G06F 9/4401; G06F 9/442; H04W 4/008
See application file for complete search history.

(56) References Cited

U.S. PATENT DOCUMENTS

| | | | |
|---|---|---|---|
| 2008/0032627 A1* | 2/2008 | Kang ................. | H04N 1/00236 455/41.2 |
| 2010/0235616 A1* | 9/2010 | Lagnado .................. | G06F 8/60 713/2 |
| 2017/0083427 A1* | 3/2017 | Xie ........................ | G06F 11/366 |

OTHER PUBLICATIONS

Cobb et al., RSA algorithm, WhatIs.com, p. 1, date unknown.*

* cited by examiner

*Primary Examiner* — Stefan Stoynov
(74) *Attorney, Agent, or Firm* — McClure, Qualey & Rodack, LLP

(57) ABSTRACT

A checking method for electronic device includes receiving a fast boot signal and entering into a fast boot stage in response to the fast boot signal. The fast boot stage includes executing a part of bootstrap program, reading machine information of an electronic device after the execution of the part of bootstrap program is finished, driving an output module of the electronic device, outputting an external signal by the output module according to the machine information, and staying in the fast boot stage after the external signal is output.

18 Claims, 15 Drawing Sheets

CHECKING METHOD FOR ELECTRONIC DEVICE AND COMPUTER PROGRAM PRODUCT THEREOF

CROSS-REFERENCES TO RELATED APPLICATIONS

This non-provisional application claims priority under 35 U.S.C. § 119(a) on Patent Application No. 105104828 filed in Taiwan, R.O.C. on 2016 Feb. 18, the entire contents of which are hereby incorporated by reference.

BACKGROUND

Technical Field

The instant disclosure relates to an unpacking detection for electronic device, in particular, to a checking method for electronic device and a computer program product thereof.

Related Art

Along with the technology innovations, electronic devices with diverse functions are developed continuously and become an essential part in humans' daily life. Electronic devices, like smart phones, portable navigation devices (PND), digital cameras, notebooks, tablets, IP cameras, or event data recorders (EDR), are frequently and commonly used by people due to the conveniences provided by the electronic devices.

Electronic device factories have many testing stations for checking if the software or hardware of the electronic device runs normally and if the serial number, the version, or other information of the electronic device is correct during the manufacturing of the electronic device.

Theoretically, the inspection of the functions and the data of the software/hardware can be finished in the operating system stage (for example, Windows, Mac OSX, Unix, Android, iOS, Mango, Apollo, etc.). However, in practice, after the inspection of the electronic device is finished, the electronic device has to be reset and restored to its initial state where those temporary data required by the inspection are removed.

Besides the tests during the manufacturing of the electronic device, there is an out of box (OOB) inspection procedure for the electronic device before the electronic device leaves the factory. In the out of box inspection procedure, a boxed electronic device is taken out of the box and boot to load its operating system for checking if the machine information of the electronic device is correct again. When the electronic device is boot for the first time, the electronic device executes a detection procedure and stores related settings. However, some electronic devices are designated to be write-once only based on their using requirements, the setting of these write-once only devices cannot be renewed. As a result, electronic devices with write-once only design cannot execute the out of box inspection procedure, and qualities of the electronic devices cannot be ensured.

SUMMARY

In view of these, in one embodiment, a checking method for electronic device comprises: receiving a fast boot signal and entering into a fast boot stage in response to the fast boot signal. Wherein, the fast boot stage comprises: executing a part of a bootstrap program; reading machine information of an electronic device after the execution of the part of the bootstrap program is finished; driving an output module of the electronic device; outputting an external signal by the output module according to the machine information; and staying at the fast boot stage after the external signal is output.

In another embodiment, a computer program product comprises at least one program instruction stored in a computer readable medium. The program instruction is loaded and executed by an electronic device to cause the electronic device to implement the checking method according to any embodiment of the instant disclosure.

Based on the above, the checking method for electronic device and a computer program product thereof according to any of the forgoing embodiments allows the machine information of an electronic device to be checked without loading the operating system of the electronic device. Therefore, the quality of the electronic device can be ensured and the sale staff can check the machine information of the electronic device conveniently before he or she sells the electronic device.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
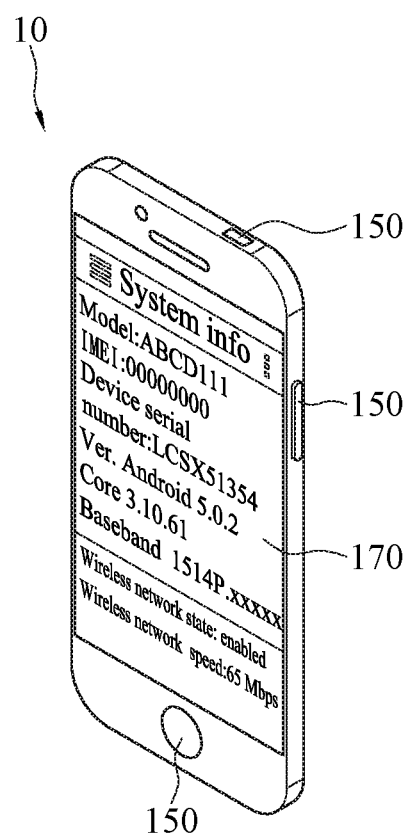
FIG. 1 illustrates a schematic view of a checking system according an exemplary embodiment of the instant disclosure.
Figure 2:
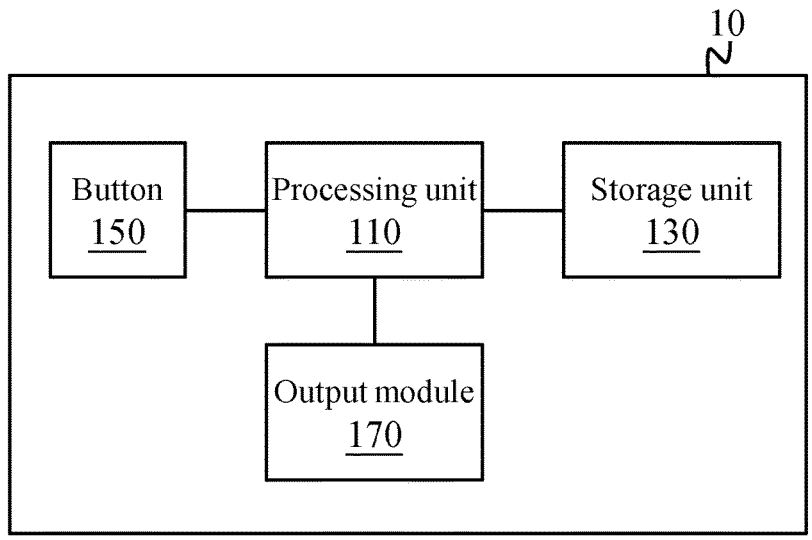
FIG. 2 illustrates a functional block diagram of the checking system of FIG. 1.
Figure 3:
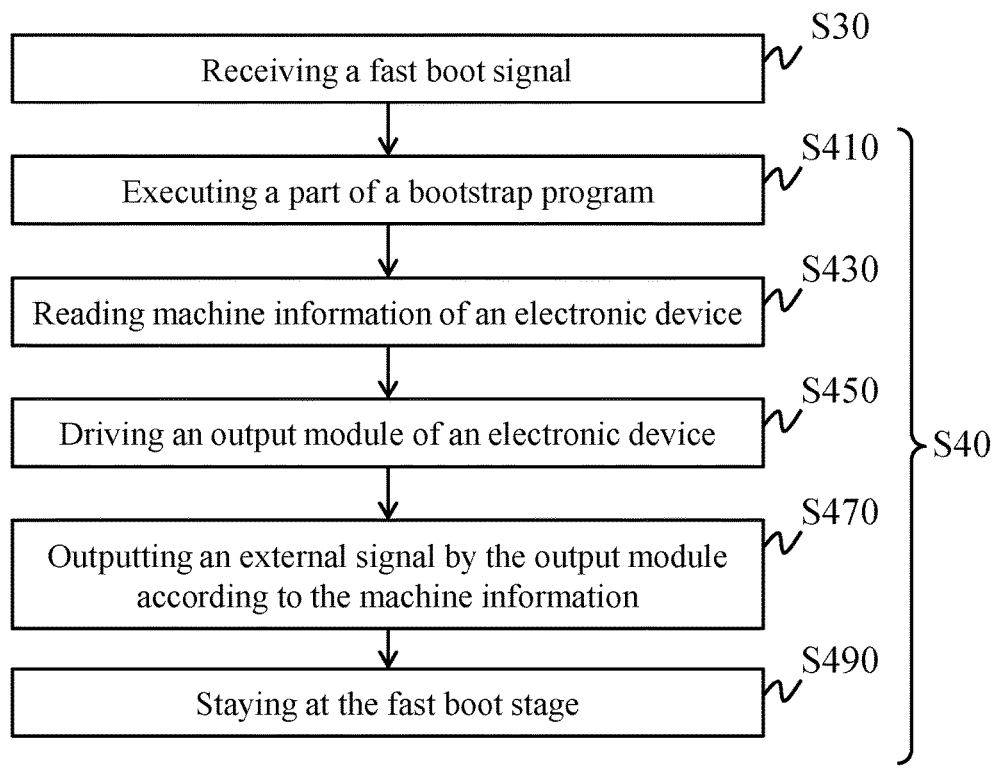
FIG. 3 illustrates a flowchart of a checking method for electronic device according to an exemplary embodiment of the instant disclosure.
Figure 4:
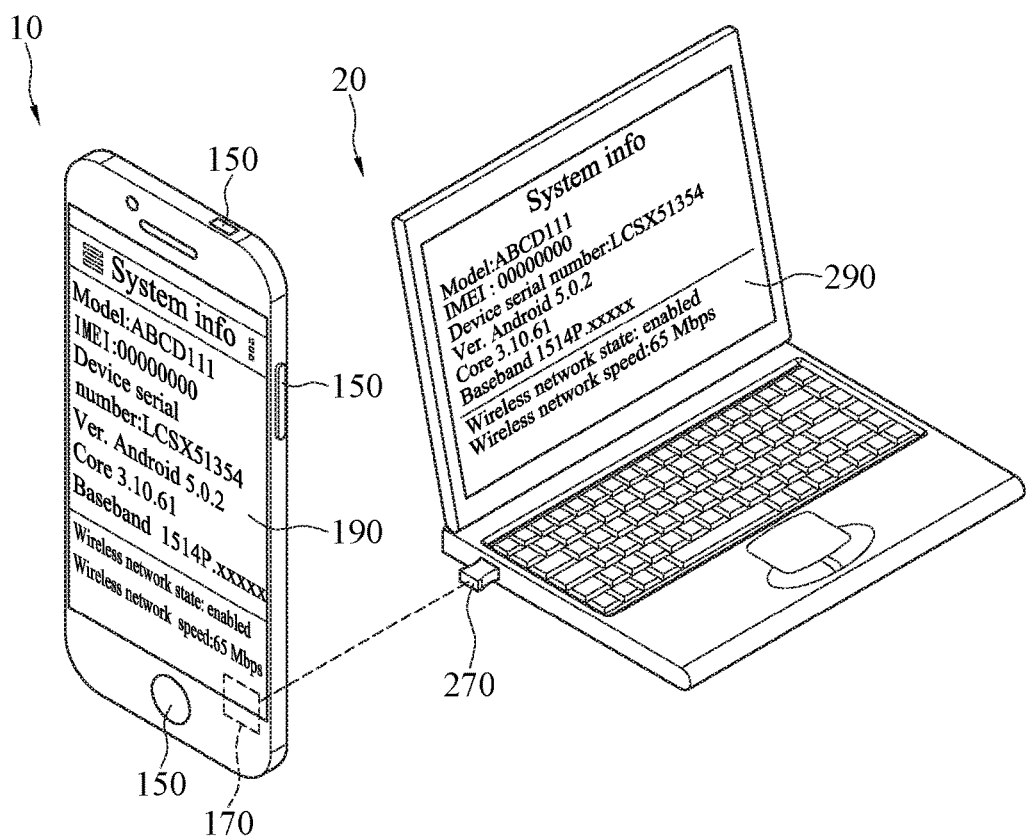
FIG. 4 illustrates a schematic view of another embodiment of the checking system.

FIG. 1 illustrates a schematic view of a checking system according to an exemplary embodiment of the instant disclosure. FIG. 2 illustrates a functional block diagram of the checking system of FIG. 1. FIG. 3 illustrates a flowchart of a checking method for electronic device according to an exemplary embodiment of the instant disclosure.

Please refer to FIGS. 1 and 2. The checking system comprises an electronic device 10 to be checked. The electronic device 10 may be a portable electronic device, like a smart phone, a portable navigation device (PND), a digital camera, a notebook, a tablet, an IP camera, an event data recorder (EDR), etc.

The electronic device 10 comprises a processing unit 110, a storage unit 130, at least one button 150, and an output module 170. The processing unit 110 is connected to the storage unit 130, the button 150, and the output module 170.

In this embodiment, the electronic device 10 has at least two boot modes. The boot modes include a normal boot mode and a fast boot mode. Under the normal boot mode, the processing unit 110 of the electronic device 10 enters into the operating system stage (i.e., executes the operating system) after the processing unit 110 of the electronic device 10 executes a bootstrap program (normal boot stage). Under the fast boot mode, the processing unit 110 of the electronic device 10 does not enter into the operating system stage (i.e., does not load the operating system) after the processing unit 110 of the electronic device 10 executes a part of the bootstrap program (fast boot stage). The operating system may be, but not limited to, Windows, Mac OSX, Unix, Android, iOS, Mango, Apollo. In some embodiments, the electronic device 10 provides different boot operations for determining the boot modes. For example, but not limited to, a user may long press the power button (one of the buttons 150) of the electronic device 10 alone to allow the electronic device 10 entering into the normal boot mode, and the user may long press the power button and the return button (another of the buttons) at the same time to allow the electronic device 10 entering into the fast boot mode.

Please refer to FIG. 3, upon the checking procedure is performed, the button 150 of the electronic device 10 is actuated (for example, a combination of certain buttons 150 are pressed) to generate a fast boot signal to the processing unit 110. The processing unit 110 receives the fast boot signal (step S30) and enters into a fast boot stage in response to the fast boot signal (step S40).

Under the fast boot stage (step S40), the processing unit 110 executes a part of a bootstrap program (Step S410). After the execution of the part of the bootstrap program is finished, the processing unit 110 reads machine information of the electronic device from the storage unit 130 of the electronic device 10 (step S430). In addition, the processing unit 110 drives the output module 170 (step S450). Next, the output module 170 outputs an external signal according to the machine information (step S470). After the external signal is output, the processing unit 110 stays at the fast boot stage (step S470), i.e., the processing unit 110 does not execute the operating system.

The machine information may be the model number, the international mobile equipment identity (IMEI) number, the device serial number, the type of the operating system, the version of the operating system, the software number, the core version, the baseband version, the installation number, the integrate circuit card identity (ICCID) number, the version of the modern firmware, or any combination thereof.

In some embodiments, the output module 170 may be a screen. In one embodiment of the step S470, the processing unit 110 controls the screen (the output module 170) to display the machine information, so that an inspector can check the machine information.

In some embodiments, please refer to FIGS. 4 to 7, the checking system may further comprise a host end 20. The host end 20 may be a computer system, for example, a personal computer (PC), a notebook, a tablet, etc. The host end 20 comprises a processing unit 210, a storage unit 230, an input module 270, and a screen 290. The processing unit 210 is connected to the storage unit 230, the input module 270, and the screen 290.

The input module 270 of the host end 20 receives the external signal output by the electronic device 10 (step S510). Then, the processing unit 210 or the input module 270 generates the machine information according to the external signal (step S530), and the processing unit 210 stores the machine information in the storage unit 230 (step S550).

In some embodiments, the electronic device 10 may further comprise a screen 190 connected to the processing unit 110. Accordingly, besides of outputting the external signal to the host end 20 through the output module 170, the processing unit 110 may further control the screen 190 to display the machine information. In other words, the electronic device 10 may stay at a condition where the screen 190 displays the machine information.

In some embodiments, please refer to FIGS. 4 to 6 and 8, the processing unit 210 of the host end 20 may control the screen 290 to display the machine information after the machine information is generated (step S570), so that the inspector can check the machine information.

In some embodiments, please refer to FIGS. 4 to 6 and 9, the processing unit 210 compares the machine information with predetermined information after the machine information is generated (step S590). If the predetermined information does not match with the machine information, the processing unit 210 will generate an alert message and output the alert message (step S591). For example, if the predetermined information does not match with the machine information, the processing unit 210 allows a window with the alert message to be displayed (i.e., to display the alert message) on the screen 290 or controls the speaker of the host end 20 to produce alert sounds (i.e., the alert message in another embodiment). If the predetermined information matches with the machine information, the processing unit 210 will not generate the alert message (step S593) and/or the processing unit 210 controls the screen 290 to display the machine information. In other words, if the predetermined information matches with the machine information, in one embodiment, the processing unit 210 will not generate the alert message; in another embodiment, the processing unit 210 will control the screen 290 to display the machine information; in yet another embodiment, the processing unit 210 will not generate the alert message and will control the screen 290 to display the machine information.

The predetermined information may be machine information with expected information, and the machine information is input or stored in the storage unit 230 in advance.

In some embodiments, the output module 170 and the input module 270 may have a bidirectional communication function. Please refer to FIGS. 4 to 6 and 10, after the machine information is generated, the processing unit 210 generates a shut down command (step S610), and the processing unit 210 sends the shut down command to the output module 170 by the input module 270 (step S630). The processing unit 110 receives the shut down command by the output module 170 (step S650), and the processing unit 110 executes a shut down procedure in response to the shut down command (step S670) to turn off the electronic device 10.

In some embodiments, when the output module 170 is a wireless module (hereinafter, called a first wireless module), the input module 270 is another wireless module (hereinafter, called a second wireless module) mating with the first wireless module. The second wireless module may be built in the host end 20 or externally connected to the host end 20. In one embodiment of the step S470, the first wireless module wirelessly outputs (for example, emits or broadcasts) an external signal, so that the second wireless module wirelessly received the external signal output by the first wireless module.

Figure 11:
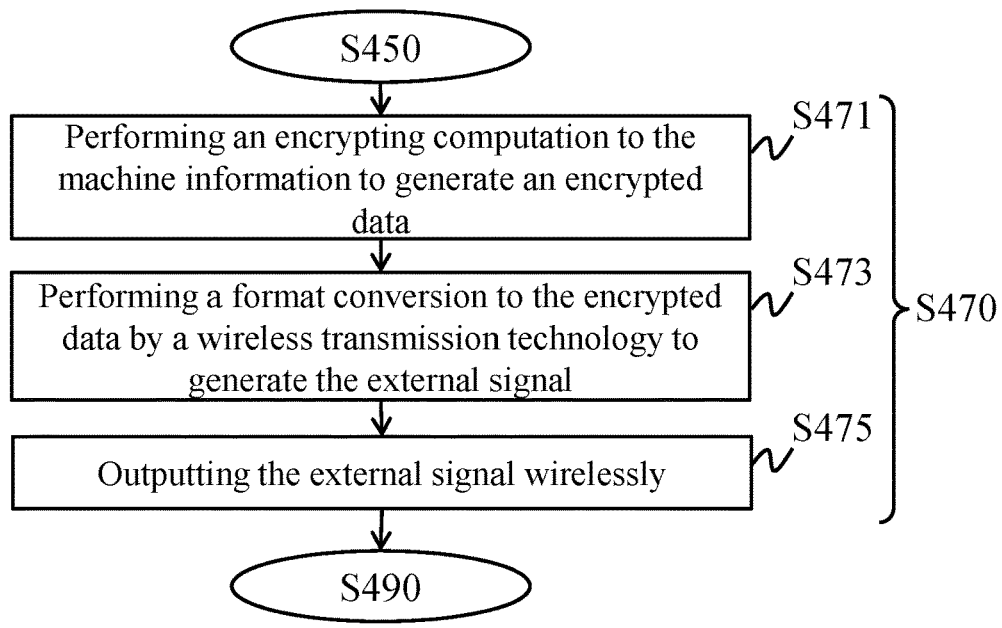
FIG. 11 illustrates a detailed flowchart of one embodiment of the step S470.

In addition, as further shown in FIG. 11, in some embodiments of the step S470, the first wireless module firstly performs an encrypting computation to the machine information to generate an encrypted data (step S471). And then, the first wireless module performs a format conversion to the encrypted data by a wireless transmission technology to generate the external signal (i.e., the wireless signal) (step S473). Next, the first wireless module wirelessly outputs the external signal to the second wireless module (step S475).

Figure 12:
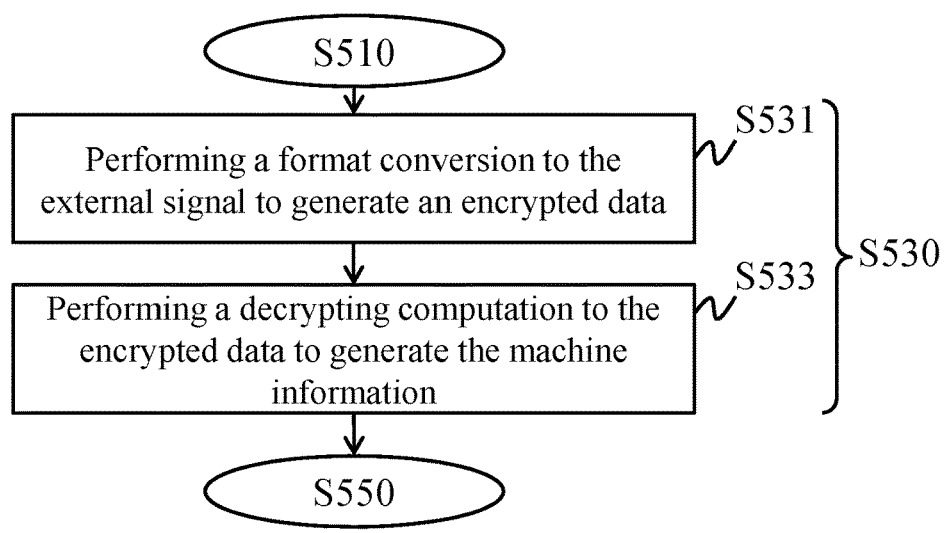
FIG. 12 illustrates a detailed flowchart of one embodiment of the step S530.

In this embodiment, as further shown in FIG. 12, in some embodiments of the step S530, after the second wireless module receives the external signal, the second wireless module performs a format conversion to the external signal by a wireless transmission technology corresponding to the first wireless module to generate an encrypted data (step S531). And then, the second wireless module performs a decrypting computation corresponding to the encrypting computation to the encrypted data to generate the machine information (step S533).

In some embodiments, the first wireless module (the output module 170) and the second wireless module (the input module 270) may use the same wireless transmission technology, and the first wireless module and the second wireless module may be infrared modules, Bluetooth modules, Zwave modules, near-field communication (NFC) modules, Zigbee modules, or WiFi modules. Correspondingly, the wireless transmission technology may be infrared transmission technology, Bluetooth transmission technology, Zwave transmission technology, near-field communication (NFC) transmission technology, Zigbee transmission technology, or WiFi transmission technology.

In some embodiments, the encrypting computation and the decrypting computation utilize the same computation technology. The computation technology may be the massage-digest algorithm (MD5), the secure hash algorithm, the Rivest-Shamir-Aldeman (RSA) encrypting algorithm, or the Caesar Cipher algorithm.

Figure 5:
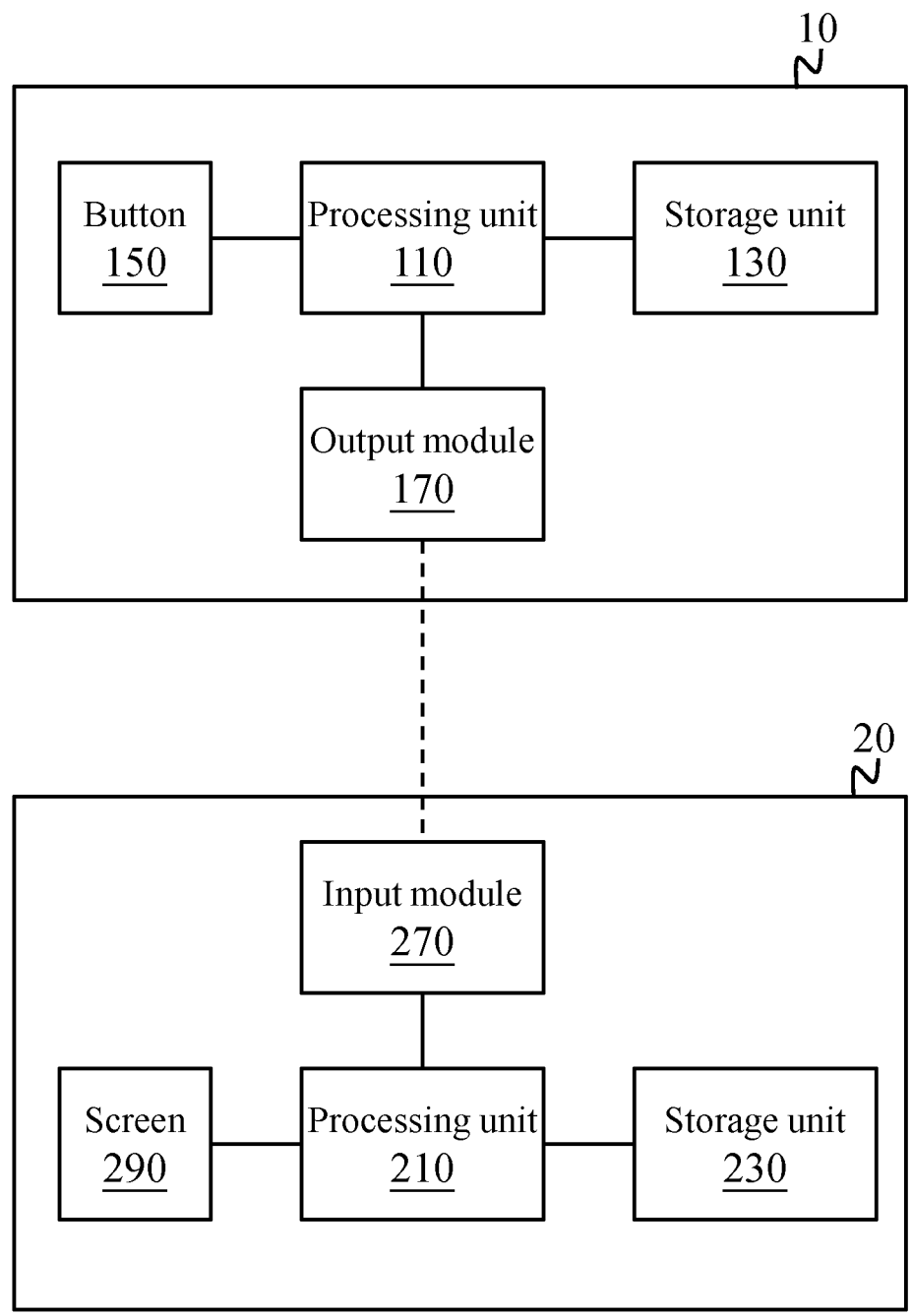
FIG. 5 illustrates a functional block diagram of one embodiment of the checking system of FIG. 4.
Figure 6:
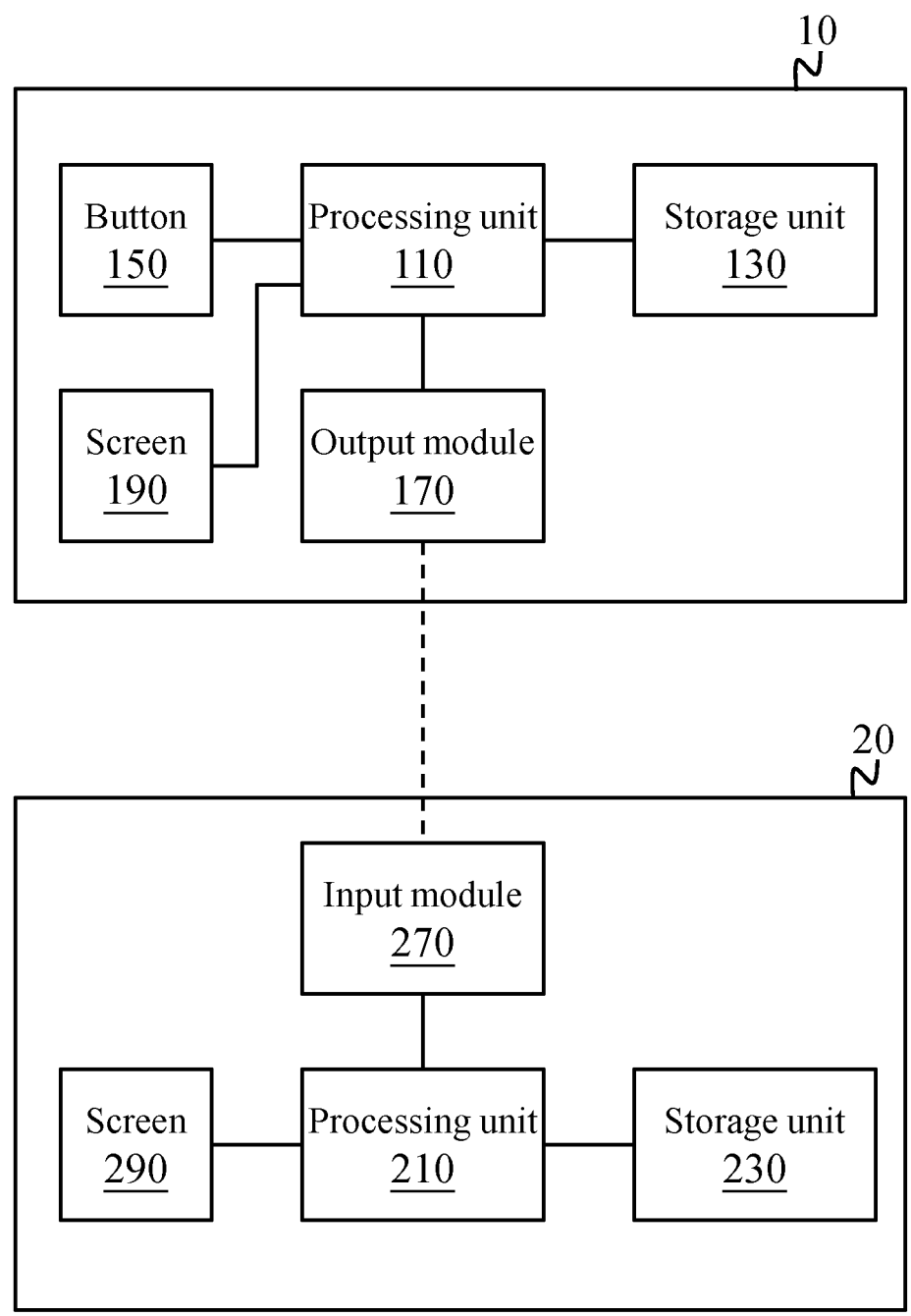
FIG. 6 illustrates a functional block diagram of another embodiment of the checking system of FIG. 4.
Figure 7:
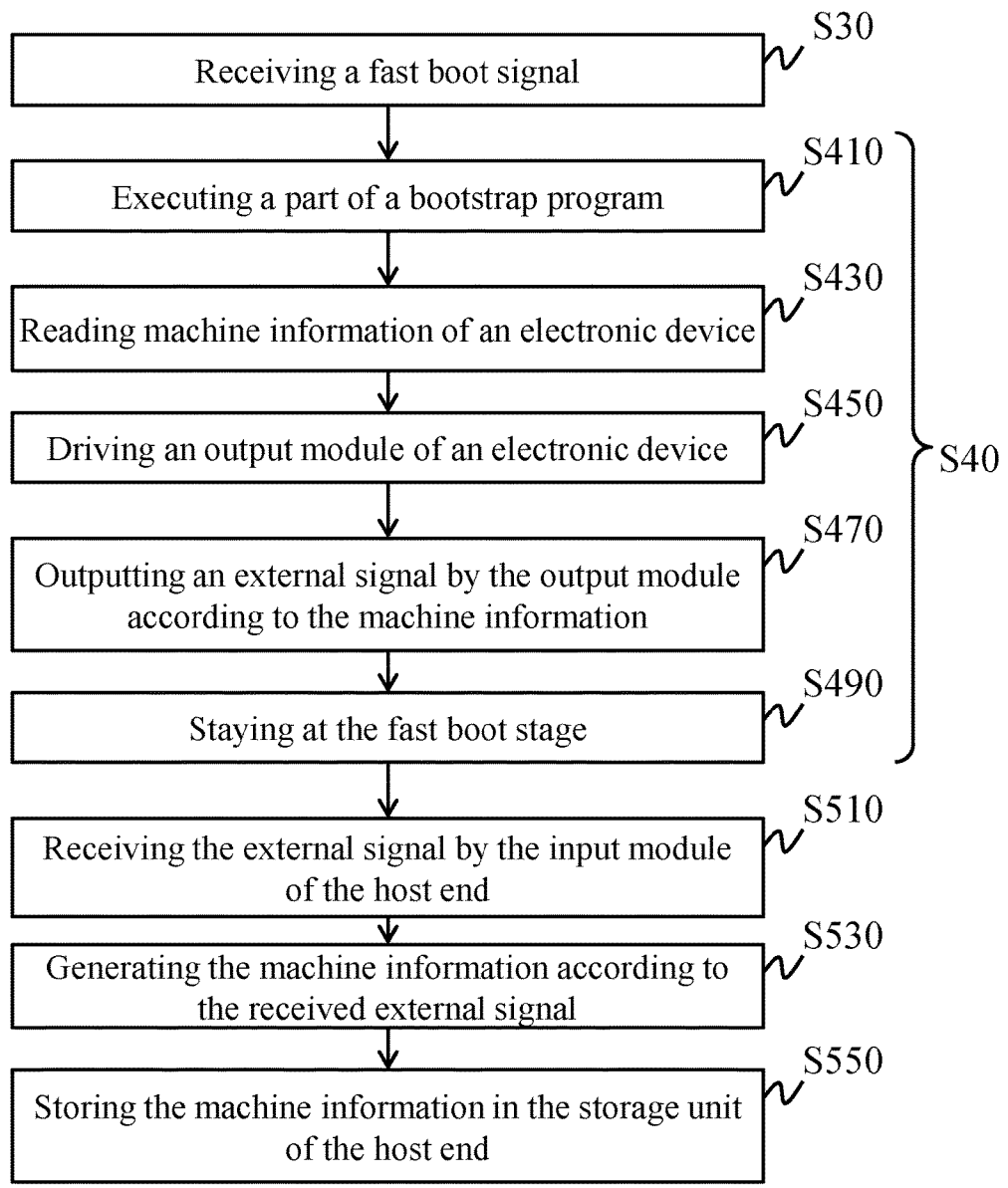
FIG. 7 illustrates a flowchart of another embodiment of the checking method for electronic device.
Figure 8:
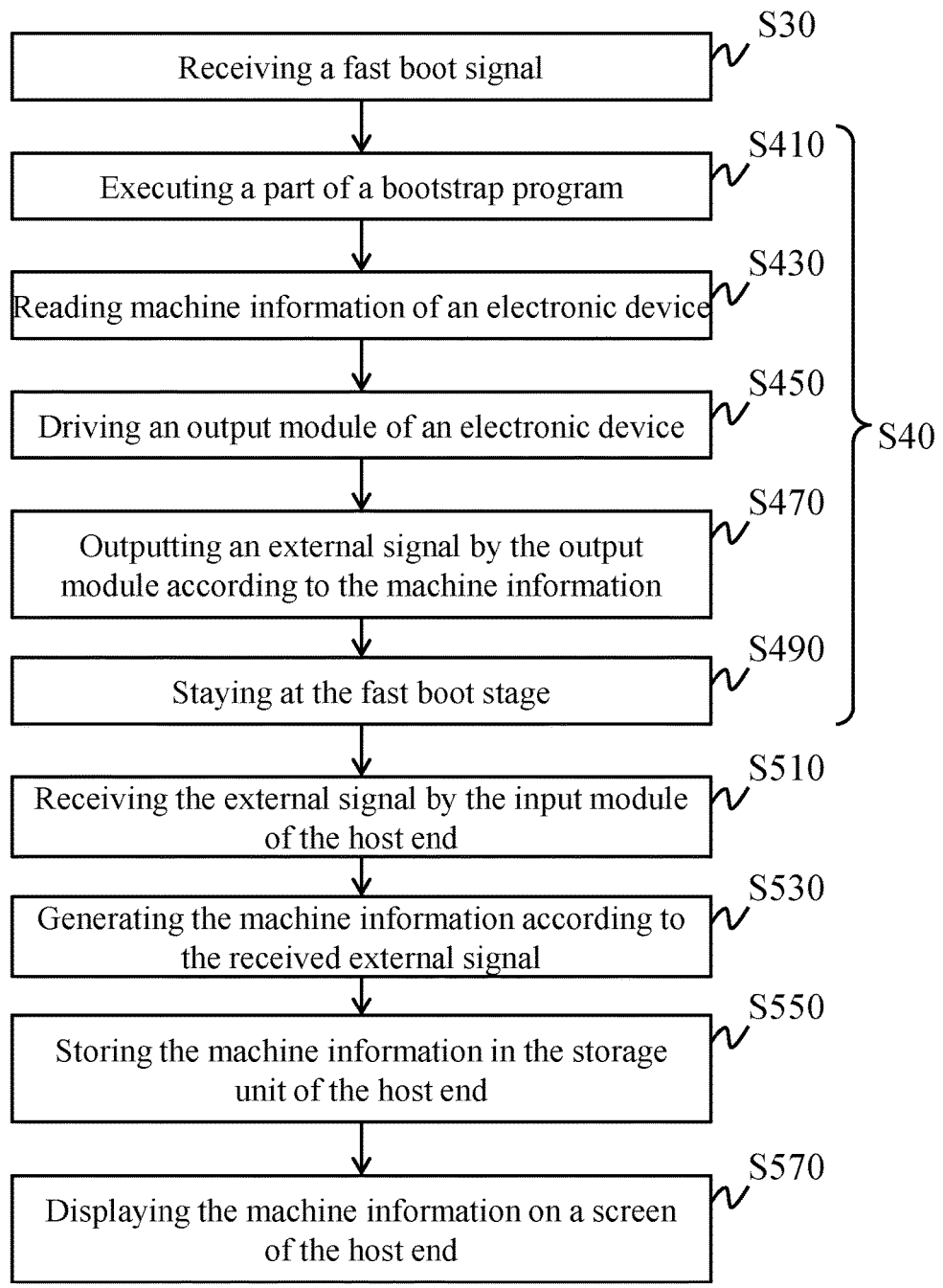
FIG. 8 illustrates a flowchart of yet another embodiment of the checking method for electronic device.
Figure 9:
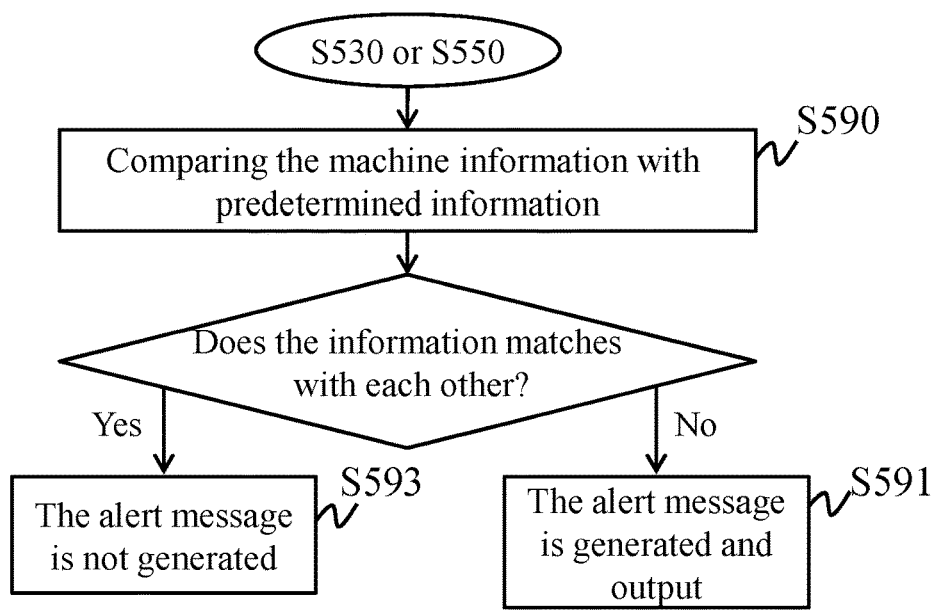
FIG. 9 illustrates a partial flowchart of one embodiment of the checking method for electronic device.
Figure 10:
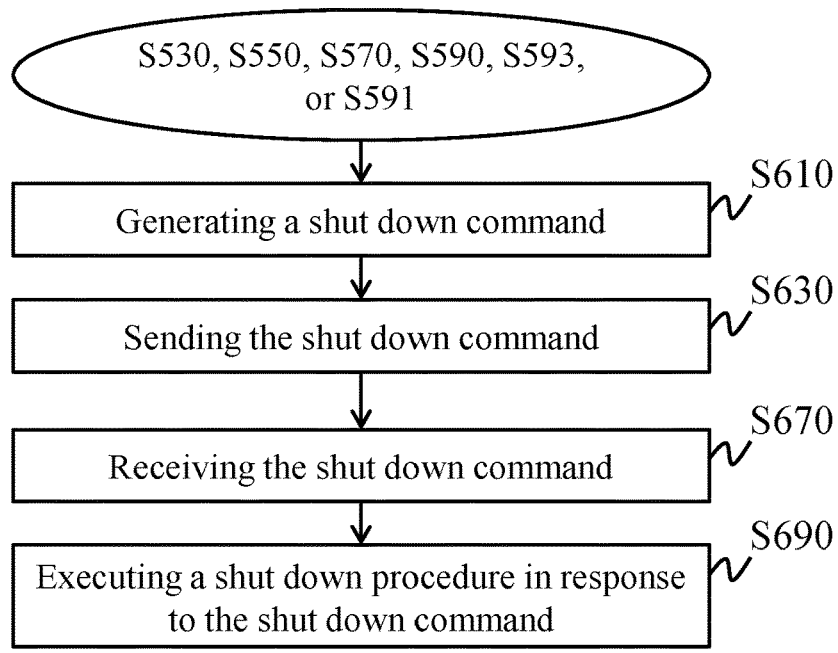
FIG. 10 illustrates a partial flowchart of another embodiment of the checking method for electronic device.
Figure 13:
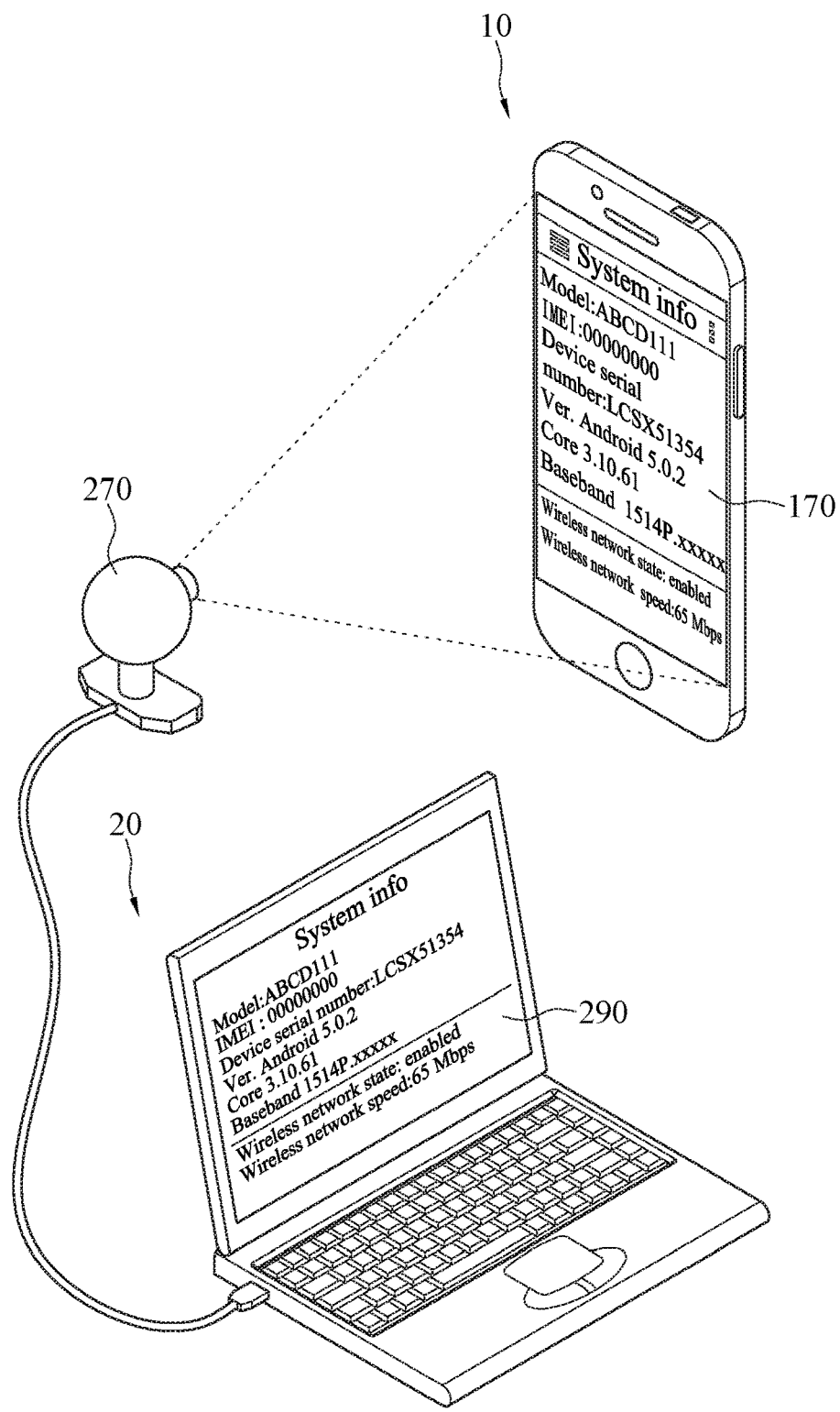
FIG. 13 illustrates a schematic view of yet another embodiment of the checking system.

In some embodiments, as shown in FIG. 5 and FIG. 13, when the output module 170 is a screen, the input module 270 may be an image capturing module, and the capturing shot of the image capturing module faces the screen of the electronic device 10. Moreover, the image capturing module may be built in the host end 20 or externally connected to the host end 20.

Figure 14:
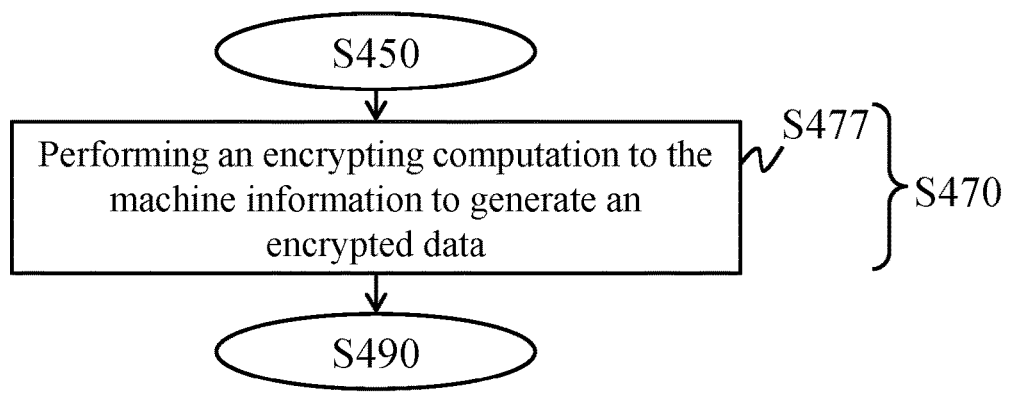
FIG. 14 illustrates a detailed flowchart of another embodiment of the step S470.

Please refer to FIG. 14. In one embodiment of the step S470, the processing unit 110 controls the screen (the output module 170) to display the machine information (step S477).

Figure 15:
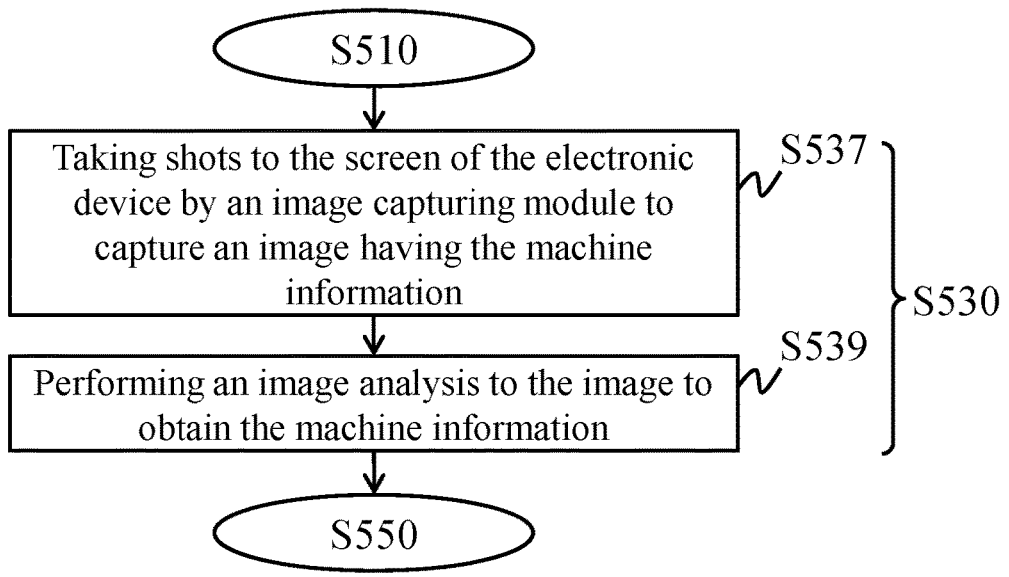
FIG. 15 illustrates a detailed flowchart of another embodiment of the step S530.

Please refer to FIG. 15. In some embodiments of the step S530, the image capturing module (the input module 270) take shots to the screen of the electronic device 10 to capture an image having the external signal (the machine information displayed on the screen) (step S537). And then, the processing unit 210 receives the image and performs an image analysis (for example, character recognition) to the image to obtain the external signal (the machine information) (step S539).

Figure 16:
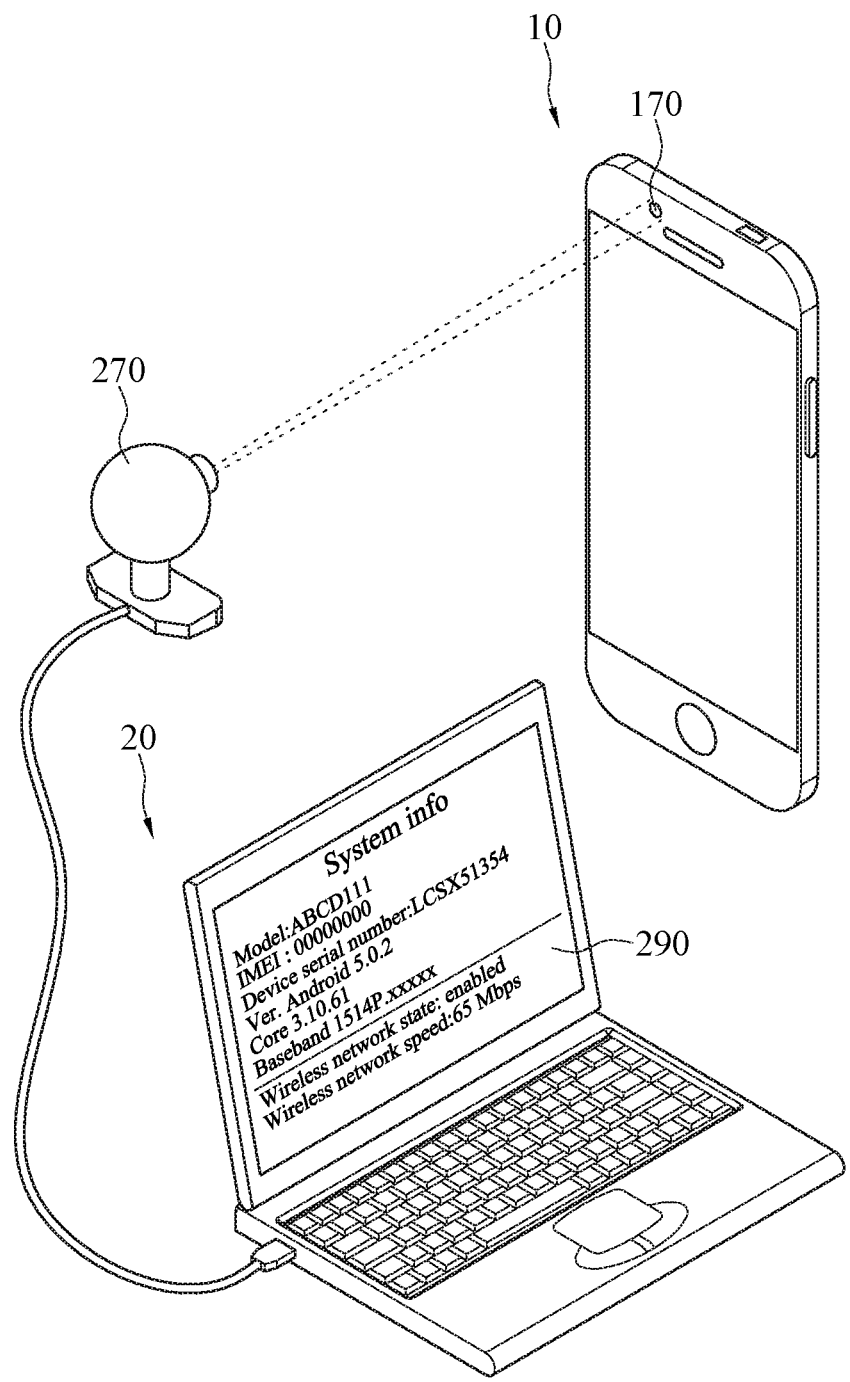
FIG. 16 illustrates a schematic view of further yet another embodiment of the checking system.

In some embodiments, as shown in FIGS. 5 and 16, when the output module 170 is a light emitting module having one or more light emitting elements, the input module 270 may be an image capturing module and the capturing shot of the image capturing module faces the light emitting module of the electronic device 10. Moreover, the image capturing module may be built in the host end 20 or externally connected to the host end 20.

Figure 17:
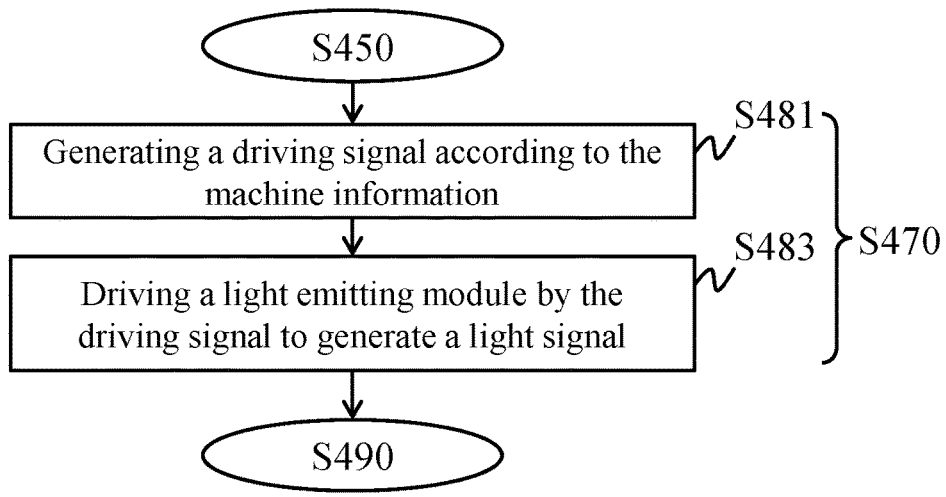
FIG. 17 illustrates a detailed flowchart of yet another embodiment of the step S470.

Please refer to FIG. 17. In one embodiment of the step S470, the processing unit 110 generates a driving signal according to the machine information (step S481). And then, the light emitting module is driven by the driving signal to generate a light signal (step S483). In some embodiments, the storage unit 130 may store a correspondence table having the machine information and the driving signal in advance. In the step S481, the processing unit 110 can look up the correspondence table to obtain the driving signal corresponding to the obtained machine information. In some embodiments, if the light emitting module has only one light emitting element, light signals (in different frequencies or different blinking ways) are performed by the light emitting module to represent different machine information.

Figure 18:
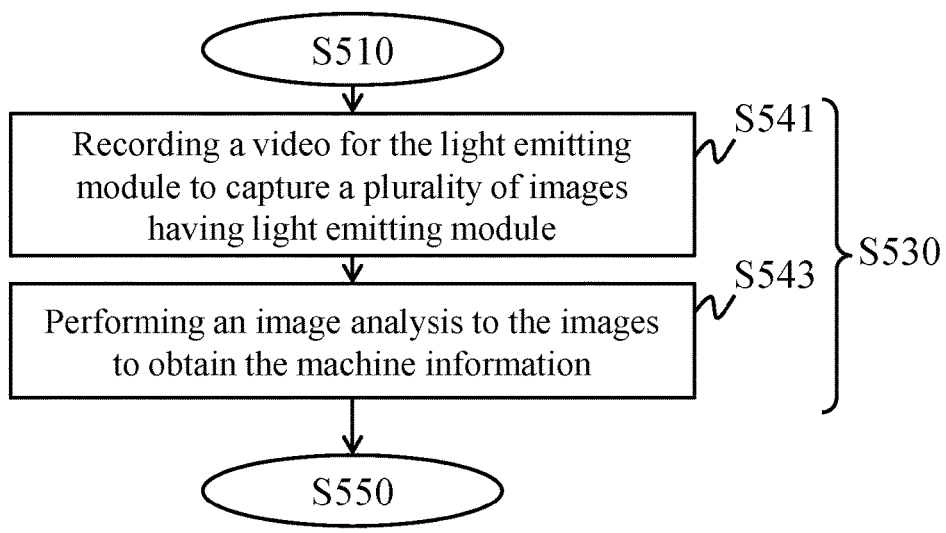
FIG. 18 illustrates a detailed flowchart of yet another embodiment of the step S530.

Please refer to FIG. 18. In some embodiments of the step S530, the image capturing module (the input module 270) records a video for the light emitting module of the electronic device 10 to capture sequential images having the external signal (the machine information displayed on the screen) (step S541). And then, the processing unit 210 receives the images and performs an image analysis (for example, character analysis) to the images to obtain the machine information (step S543). In this embodiment, the processing unit 210 analyzes the characters of the light signals (the frequency of the light or the blinking way of the light) of the sequential images, and converts the light signals back into the corresponding machine information based on the analysis of the light signals.

Figure 19:
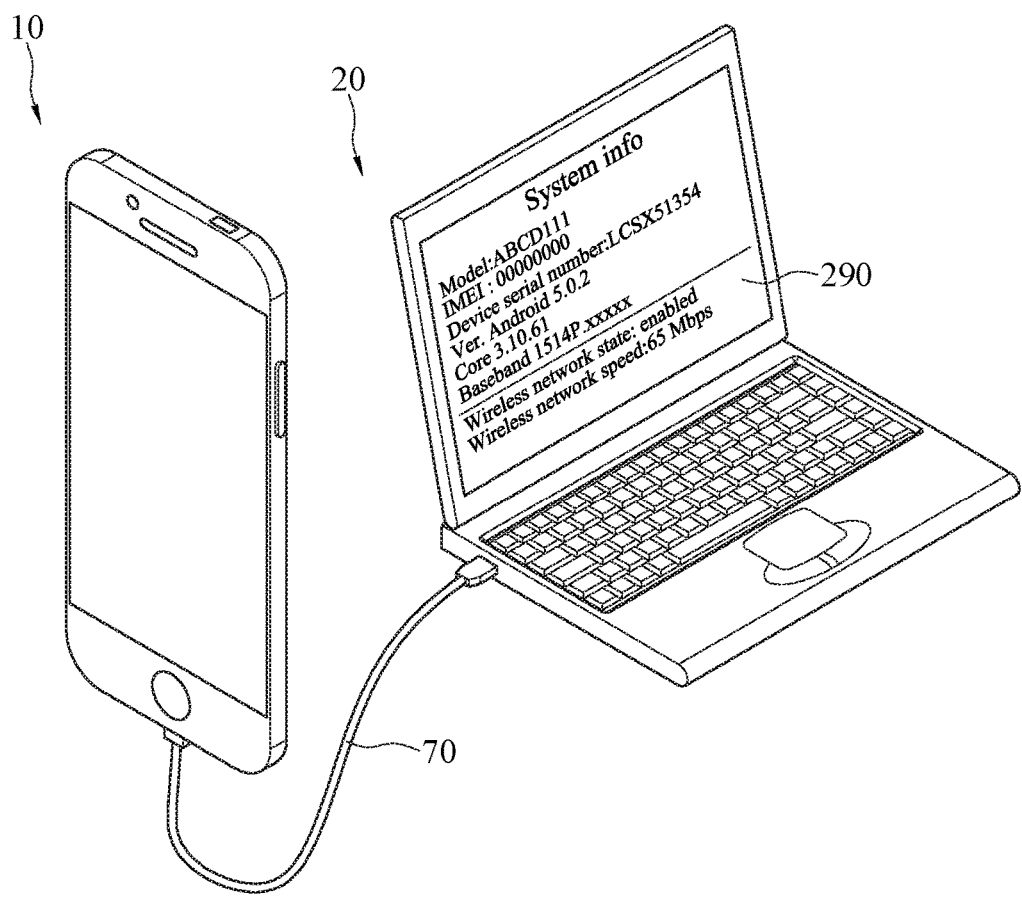
FIG. 19 illustrates a schematic view of still yet another embodiment of the checking system.

In some embodiments, as shown in FIGS. 5 and 19, when the output module 170 is a USB connecting port, the input module 270 may be another USB connecting port, and the two USB connecting ports are electrically connected with each other by a USB connecting wire 70.

Figure 20:
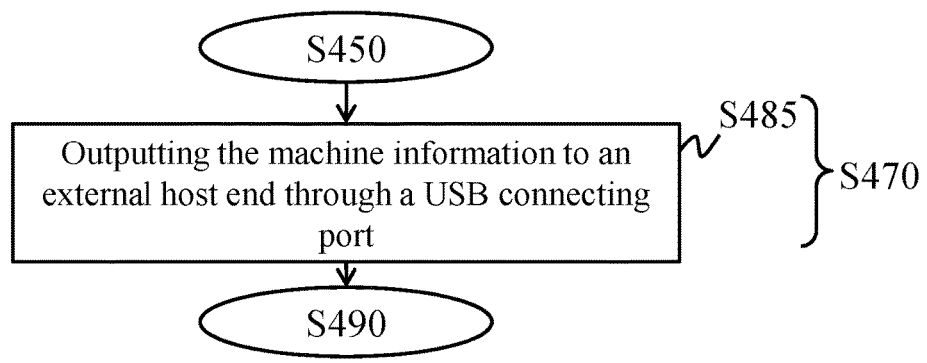
FIG. 20 illustrates a detailed flowchart of still yet another embodiment of the step S470.

Please refer to FIG. 20. In one embodiment of the step S470, the processing unit 110 outputs the machine information to the host end 20 through the USB connecting ports (the output module 170 and the input module 270) (step S485).

It is understood that, the order of the steps described in the above is provided for illustrative purpose, not a limitation. It is understood that some the steps may be performed at the same time, or may be exchanged with each other.

In some embodiments, the processing unit 110/210 may be a microprocessor, a microcontroller, a digital signal processor, a microcomputer, a central processor, a field programmable gate array, a programmable logic device, a state machine, a logic circuit, an analog circuit, a digital circuit, and/or any equipment based on (analog and/or digital) control command.

In some embodiments, the storage unit 130/230 may be a single integrated unit or multiple units. The storage unit may be a read only memory, a random access memory, a volatile memory, a non-volatile memory, a static memory, a dynamic memory, a flash memory, and/or any equipment for storing digital information.

In some embodiments, the light emitting element may be a limiting emitting diode (LED).

In some embodiments, the checking method for electronic device may be implemented by a computer program product. The computer program product comprises at least one program instruction. Accordingly, when an electronic device loads and executes the program instruction, the checking method for electronic device according to any of the forgoing embodiments can be applied to the electronic device. In some embodiments, the computer program product is a computer readable medium, and the program instruction is stored in the computer readable medium for the electronic device to read and load. In some embodiments, the program instruction itself may be the computer program product, and the program command is transmitted to the electronic device via wire.

Based on the above, the checking method for electronic device and a computer program product thereof according to any of the forgoing embodiments allows the machine information of an electronic device to be checked without loading the operating system of the electronic device. Therefore, the quality of the electronic device can be ensured and the sale staff can check the machine information of the electronic device conveniently before he or she sells the electronic device.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A checking method for electronic device, the electronic device has a normal boot mode and a fast boot mode, the checking method comprising:
   receiving a fast boot signal; and
   entering into a fast boot stage of the fast boot mode in response to the fast boot signal, wherein the fast boot stage comprises:
   executing a part of a bootstrap program;
   reading machine information of an electronic device after the execution of the part of the bootstrap program is finished;
   driving an output module of the electronic device;
   outputting an external signal by the output module according to the machine information; and
   staying at the fast boot stage without loading an operating system after the external signal is output.

2. The checking method for electronic device according to claim 1, wherein the output module is a wireless module, and wherein the step of outputting the external signal by the output module comprises wirelessly outputting the external signal by the wireless module.

3. The checking method for electronic device according to claim 2, wherein the step of outputting the external signal by the output module further comprises:
   performing an encrypting computation to the machine information to generate an encrypted data; and
   performing a format conversion to the encrypted data by a wireless transmission technology to generate the external signal.

4. The checking method for electronic device according to claim 3, wherein the encrypting computation is performed with one of massage-digest algorithm (MD5), secure hash algorithm, Rivest-Shamir-Aldeman (RSA) encrypting algorithm, and Caesar Cipher algorithm.

5. The checking method for electronic device according to claim 2, wherein the wireless module is an infrared module, a Bluetooth module, a Zwave module, a near-field communication (NFC) module, a Zigbee module, or a WiFi module.

6. The checking method for electronic device according to claim 1, wherein the output module is a light-emitting module, and wherein the step of outputting the external signal by the output module comprises:
   generating a driving signal according to the machine information; and
   driving the light-emitting module by the driving signal to generate a light signal.

7. The checking method for electronic device according to claim 1, wherein the output module is a screen, and wherein the step of outputting the external signal by the output module comprises controlling the screen to display the machine information.

8. The checking method for electronic device according to claim 1, wherein the output module is a USB connecting port, and wherein the step of outputting the external signal by the output module comprises outputting the machine information to an external host end through the USB connecting port.

9. The checking method for electronic device according to claim 1, wherein the fast boot stage further comprises:
   receiving a shut down command by the output module; and
   executing a shut down procedure in response to the shut down command.

10. The checking method for electronic device according to claim 1, further comprising:
    receiving the external signal by an input module of a host end.

11. The checking method for electronic device according to claim 10, further comprising:
    generating the machine information according to the received external signal; and
    storing the machine information in a storage unit of the host end.

12. The checking method for electronic device according to claim 11, further comprising:
    displaying the generated machine information on a screen of the host end.

13. The checking method for electronic device according to claim 10, further comprising:
    generating the machine information according to the received external signal;
    comparing the machine information with a predetermined information; and
    generating and outputting an alert message when the machine information does not match with the predetermined information.

14. The checking method for electronic device according to claim 10, wherein the input module is an infrared module, a Bluetooth module, a Zwave module, a near-field communication (NFC) module, a Zigbee module, or a WiFi module.

15. The checking method for electronic device according to claim 14, wherein the step of receiving the external signal by the input module comprises:
    performing a format conversion to the external signal by a wireless transmission technology to generate an encrypted data; and performing a decrypting computation to the encrypted data to generate the machine information.

16. The checking method for electronic device according to claim 15, wherein the decrypting computation is performed with one of massage-digest algorithm, secure hash algorithm, RSA encrypting algorithm, and Caesar Cipher algorithm.

17. The checking method for electronic device according to claim 10, wherein the input module is an image capturing module, and wherein the step of receiving the external signal by the input module of the host end comprises:
    capturing at least one image of the output module by the image capturing module; and
    performing an image analysis to the at least one image to obtain the machine information.

18. A non-transitory computer readable medium, comprising at least one program instruction, wherein the at least one program instruction is loaded and executed by an electronic device to cause the electronic device to implement the checking method according to claim 1.

* * * * *